US006535517B1

United States Patent
Arkko et al.

(10) Patent No.: US 6,535,517 B1
(45) Date of Patent: Mar. 18, 2003

(54) NETWORK ACCESS DEVICE MONITORING

(75) Inventors: Jari Arkko, Kauniainen (FI); Ralf Brunberg, Espoo (FI); Mika Korpela, Vaasa (FI); Harri Toivanen, Kirkkonummi (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/096,629

(22) Filed: Jun. 12, 1998

Related U.S. Application Data

(60) Provisional application No. 60/050,325, filed on Jun. 20, 1997.

(51) Int. Cl.⁷ .............................................. H04L 12/28
(52) U.S. Cl. ....................................... 370/401; 370/254
(58) Field of Search ................................ 370/401, 400, 370/403, 404, 409, 464, 465, 466, 467, 468, 352, 356, 410, 463, 522, 389, 375, 354; 709/227, 230, 218, 223, 224

(56) References Cited

U.S. PATENT DOCUMENTS

| | | | | |
|---|---|---|---|---|
| 4,700,340 A | | 10/1987 | Beranek et al. | 370/16 |
| 5,737,319 A | * | 4/1998 | Croslin | 370/255 |
| 5,918,019 A | * | 6/1999 | Valencia | 709/227 |
| 5,959,988 A | * | 9/1999 | Bjorkman | 370/389 |
| 6,073,176 A | * | 6/2000 | Baindur | 709/227 |

(List continued on next page.)

FOREIGN PATENT DOCUMENTS

| | | |
|---|---|---|
| EP | 0 436 201 A1 | 7/1991 |
| WO | WO 97/01910 | 1/1997 |
| WO | WO 97/22209 | 6/1997 |
| WO | WO 97/38551 | 10/1997 |

OTHER PUBLICATIONS

*Sara: A Processor Interconnection Performance Analysis Tool* by P. Navaux et al., Microprocessing and Microprogramming, vol. 24, No. 1–05, Aug. 1, 1988, pp. 197–204, XP000121387.

*Topology Identification for Traffic and Configuration Management in Dynamic Networks* by Isabelle Rouvellou and George W. Hart, One World Through Communications, Florence, May 4–8, 1992, vol. 3, No. 11, Jan. 1, 1992, pp. 2197–2204, XP000300346, Institute of Electrical and Electronics Engineers.

*Neopilot: An Integrated ISDN Fault Management System*, Communications: Connecting the Future, San Diego, Dec. 2–5, 1990, vol. 3, Dec. 2, 1990, pp. 1503–1507, XP000218827, Institute of Electrical and Electronics Engineers.

Standard Search Report for RS 101379 US Completed on Feb. 5, 1999, Feb. 11, 1999, EPO.

ISR for PCT/FI 98/00540 completed on Oct. 1, 1998, Oct. 12, 1998, PCT.

*Primary Examiner*—Douglas Olms
*Assistant Examiner*—Ricardo M. Pizarro
(74) *Attorney, Agent, or Firm*—Jenkens & Gilchrist, P.C.

(57) ABSTRACT

A method and apparatus enables a Network Access Server in association with a telecommunications switch to route incoming calls only to devices that have an actual connection to the Internet. A set of devices, RPG-Is, reformat incoming data from subscribers to a desired Internet Protocol. Initially, the expected network topology is recorded in memory for later comparison. During operation, each RPG-I attempts to detect the presence of every other expected RPG-I. If the presence of another RPG-I is not detected within a predetermined threshold period, then an alarm is issued. Error alarms are forwarded to application logic of the telecommunications switch so that the switch can avoid connecting a subscriber's call to an inoperable RPG-I. An alarm can also be forwarded to a network operator's terminal.

23 Claims, 7 Drawing Sheets

U.S. PATENT DOCUMENTS

| | | | | |
|---|---|---|---|---|
| 6,084,892 A | * | 7/2000 | Benash | 370/401 |
| 6,097,719 A | * | 8/2000 | Benash | 370/352 |
| 6,131,119 A | * | 10/2000 | Fukui | 709/224 |
| 6,134,515 A | * | 10/2000 | Skogby | 703/23 |
| 6,243,746 B1 | * | 6/2001 | Sondur | 709/220 |
| 6,252,878 B1 | * | 6/2001 | Locklear | 370/401 |
| 6,252,884 B1 | * | 6/2001 | Hunter | 370/443 |
| 6,260,071 B1 | * | 7/2001 | Armistead | 709/238 |
| 6,335,929 B1 | * | 1/2002 | Haster | 370/352 |
| 6,347,336 B1 | * | 2/2002 | Song | 709/223 |

* cited by examiner

NETWORK ACCESS DEVICE MONITORING

CROSS-REFERENCES TO RELATED APPLICATIONS

This Application for Patent claims the benefit of priority from, and hereby incorporates by reference the entire disclosure of, co-pending U.S. Provisional Application for Patent Serial No. 60/050,325, filed Jun. 20, 1997.

BACKGROUND OF THE INVENTION

1. Technical Field of the Invention

The present invention relates in general to the telecommunications field, and in particular, to a method and system for implementing a Network Access Server (NAS) in association with a telecommunications switch.

2. Description of Related Art

Access to the Internet is increasingly desirable to achieve economic, educational, and communicative purposes. Individuals typically access the Internet from a personal electronic device such as a computer, personal digital assistant, or cellular phone. Subscribers in a public telephone network establish data connections to the Internet over a NAS. The data connections to an NAS are established over Plain Old Telephone Service (POTS) phone lines or Integrated Services Digital Network (ISDN) lines. At the subscriber end, normal POTS modems or ISDN network terminals (NT-Is, for network terminals on an ISDN connection) are used to initiate the communications. Personal computers with suitable communications software and hardware are frequently used as the terminal in conjunction with either a modem or NT-I.

The NAS acts as a router and concentrator for Internet Protocol (IP) packets that arrive via the data connections. The link level of the incoming data connections can also be terminated at the NAS. For analog lines, such as those originating with a POTS modem, modem pools may be provided at the NAS. IP packets are forwarded to an Internet gateway through various possible channels from the NAS. The IP packets are then transported over the Internet to the appropriate Internet destination.

In summary, an NAS accepts modem or ISDN calls to an Internet service provider (ISP), terminates the phone connection, and interprets the link layer protocol, e.g., Point to Point Protocol (PPP). The IP data packets are then forwarded to the Internet or possibly an intranet.

An NAS typically has an internal network for receiving and routing packets to the Internet. The internal network includes both electronic devices and one or more edge routers (e.g., an Internet Point-of-Presence, or INET-POP). The electronic devices are important for terminating the phone line connection and reformatting a subscriber's data to comport with the Internet protocol. Conventional internal networks, however, cannot be monitored efficiently to maintain adequate levels of reliability.

Conventional routing protocols for the internal network can enable each electronic device to know which electronic devices and edge router(s) exist on the internal network. Unfortunately, such conventional protocols are dynamic in nature. With these conventional protocols, consequently, the internal network is unaware of which electronic devices should be on the internal network. Installation problems, for example, cannot be recognized or guarded against.

Furthermore, conventional routing protocols do not provide adequate information. For example, in a normal standalone NAS, a phone exchange will not be informed about possible internal network problems. One possible internal network problem is that an electronic device does not have a proper connection to a router that is responsible for forwarding an IP packet to the Internet, e.g., an edge router. Because these conventional routing protocols do not provide this information, the phone exchange may select an electronic device that has no actual connection to the Internet. As a result, a subscriber will not be able to access the Internet because the phone exchange has assigned such an electronic device.

Therefore, conventional routing protocols and related apparatus do not (i) provide information regarding an expected internal network topology (e.g., how many and which devices populate the internal network) or (ii) properly communicate a current status to an associated telephone switch.

SUMMARY OF THE INVENTION

The present invention provides a method and apparatus in broadcast networks for combining dynamic connectivity information with expected connectivity information to enable the detection of faulty devices. When a deviation from expected connectivity occurs, the deviation can be detected and responses taken either to avoid attempting to use a faulty device and/or to notify a network operator of the faulty device.

In a preferred embodiment, an NAS in association with a telecommunications switch includes a group of processing devices. The processing devices provide formatting changes for data being transmitted from the public telephone network to a private network such as the Internet and vice versa. The processing devices are interconnected via an Ethernet network and include a router that is a gateway to the Internet.

The expected network topology (e.g., the number and/or location of the processing devices) is initially specified. During operation of the NAS, the current network topology is periodically verified to be equivalent to the specified expected network topology. Deviations are detected when a given processing device fails to hear a "heartbeat" from every other processing device that is expected to be on the Ethernet network over a predetermined threshold period.

Problem counts are received from each processing device on the Ethernet network and a determination is made as to the faulty device or connection. This faulty device or connection is then reported to a network operator's terminal and/or used to route calls. Both incoming and current calls can be routed away from the faulty device or connection to ensure that public telephone network subscribers gain access to the Internet.

An important technical advantage of the present invention is that it enables an NAS to inform telephone network operators of installation problems.

Another important technical advantage of the present invention is that it provides the ability for an NAS to inform operators of current hardware or software problems.

Yet another important technical advantage of the present invention is that an NAS can prevent the visibility of connectivity problems to dial up subscribers by routing their calls only to the devices with good network connections.

Yet another important technical advantage of the present invention is that expected device connections are recorded, and these expected connections are periodically compared with actual current connections.

Yet another important technical advantage of the present invention is that a telephone network exchange can analyze the results of the comparison and respond accordingly so that dial-up subscribers are not connected to inactive devices.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

A preferred embodiment of the present invention and its advantages are best understood by referring to FIGS. 1–7 of the drawings, like numerals being used for like and corresponding parts of the various drawings.

Figure 1:
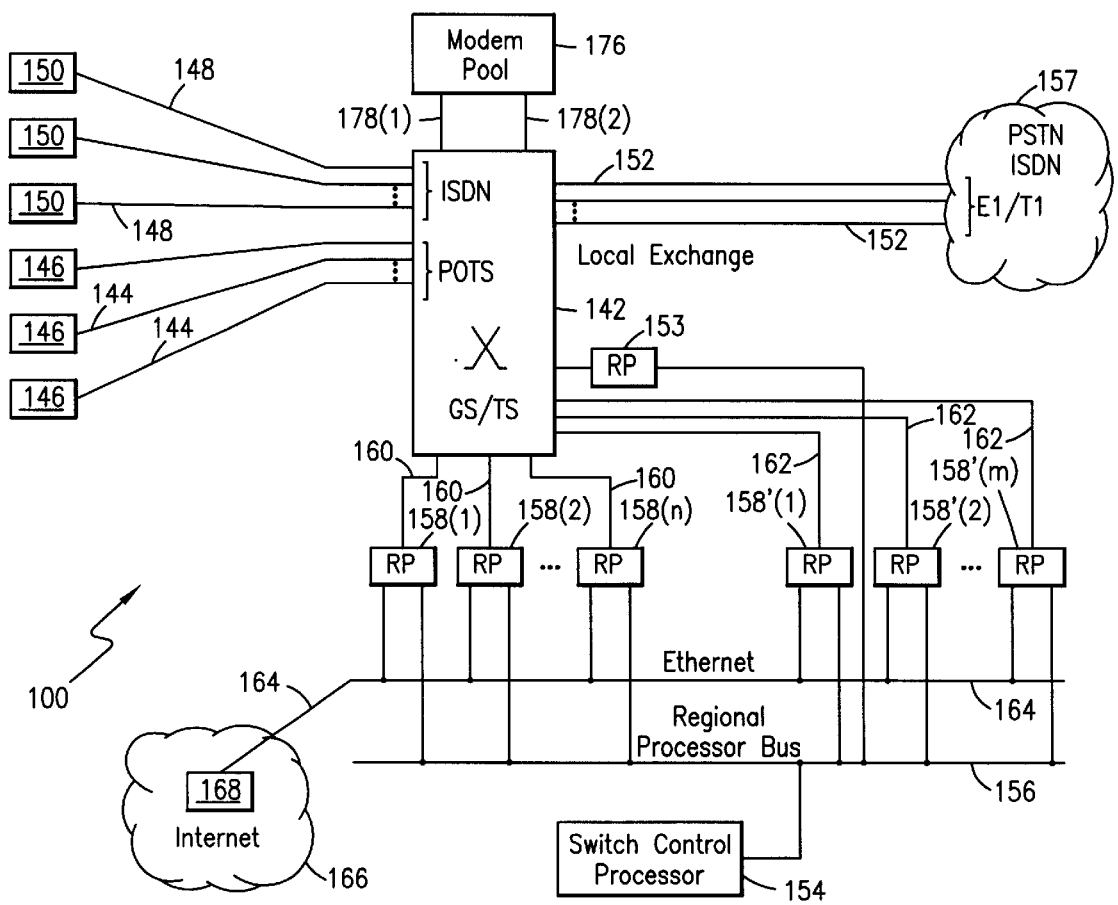
FIG. 1 illustrates a detailed diagram of a local exchange (LE) with an NAS which can be used to implement the present invention.

FIG. 1 illustrates a detailed diagram of a LE with an NAS which can be used to implement the present invention. The block diagram of a LE 100 includes an integrated NAS functionality. The LE 100 comprises a standard Ericsson AXE-type switch including a group switch/time switch (GS/TS) 142 which is connected to users 146 via a plurality of Plain Old Telephone Service (POTS) connection lines 144, as well as connected to users 150 via a plurality of ISDN 2B+D connection lines 148. The GS/TS 142 is further connected to a plurality of E1/T1 trunk connections 152 through which a communications interconnection is made to other LEs as well as to transit exchanges (TEs) over the Public Switched Telephone Network and/or ISDN (PSTN/ISDN) 157.

The GS/TS 142 of the LE 100 has a configuration and operation well known in the art for selectively interconnecting certain selected ones of the POTS connection lines 144 and/or ISDN connection lines 148 to certain selected ones of the E1/T1 trunk connections 152. Control over the operation of the GS/TS 142 in making the foregoing selected interconnections is effectuated by a regional processor (RP) 153 under the command of a central switch control processor (SCP) 154. A regional processor control bus 156 carries the signaling between the SCP 154 and the RP 153 necessary to control GS/TS 142 operation.

The LE 100 further includes a plurality of additional RPs used in providing the integrated access server functionality. A first plurality of the RPs 158(1), 158(2), . . . , 158(n) are connected via DL2 interface connections 160 to the GS/TS 142, and are connected to the SCP 154 via the regional processor control bus 156. Responsive to instructions issued by the SCP 154, data communications may be selectively connected (i.e, routed) between any one of the POTS connection lines 144 and/or ISDN connection lines 148 and the first plurality of the RPs 158(1), 158(2), . . . , 158(n).

A second plurality of the RPs 158' (1), 1581' (2), . . . , 158' (m) are connected via DL2 interface connections 162 to the GS/TS 142, and are connected to the SCP 154 via the regional processor control bus 156. Similarly, responsive to instructions issued by the SCP 154, data communications may be selectively connected (i.e., routed) between any one of the E1/T1 trunk connections 152 and the second plurality of the RPs 158' (1), 158' (2), . . . , 158' (m).

The first plurality of the RPs 158(1), 158(2), . . . , 158(n) and the second plurality of the RPs 158' (1), 158' (2), . . . , 158' (m) are interconnected by an Ethernet link 164. Responsive to instructions issued by the SCP 154 and transmitted over the regional processor control bus 156, data communications may be selectively inserted into and extracted from the Ethernet link 164 by any of the first and second plurality of RPs 158 and 158'. Using the Ethernet link 164, a direct connection may be made from the LE 100 to the Internet 166 (e.g., through an Internet access point edge router 168) without using the second plurality of the RPs 158' (1), 158' (2), . . . , 158' (m). When the second plurality of RPs 158 are used (in lieu of an edge router 168), packets may travel, for example, from a user (e.g., users 146 or 150) to one of the first plurality of RPs 158, next to the Ethernet link 164, then to one of the second plurality of RPs 158, and finally over E1/T1 trunk connections 152 towards an ISP or Internet gateway (e.g., at another LE 100).

The first plurality of RPs 158(1), 158(2), . . . , 158(n) function to convert (e.g., format or frame) the actual user data communications between the data communications protocol required for transmission over the POTS connection lines 144 and/or ISDN connection lines 148 and the data communications protocol required for transmission over the Ethernet link 164. Conversely, the second plurality of the RPs 158' (1), 158' (2), . . . , 158' (m) function to convert (e.g., format or frame) the actual user data communications between the data communications protocol required for transmission over the Ethernet link 164 and the data communications protocol required for transmission over E1/T1 trunk connections 152.

The Ethernet link 164 functions to concentrate the packets of the data communications received from the POTS connection lines 144 and/or ISDN connection lines 148 for GS/TS 142 routing and transmission over the E1/T1 trunk connections 152. Similarly, the Ethernet link 164 functions to concentrate the packets of the data communications received from the E1/T1 trunk connections 152 for GS/TS 142 routing and transmission over the POTS connection lines 144 and/or ISDN connection lines 148. It should be understood that while only one Ethernet link 164 is described in this exemplary embodiment, a plurality of Ethernet links 164 may be implemented in conjunction with the present invention. For example, each of the clusters illustrated in FIG. 2 and described below may be on a separate Ethernet link 164.

The LE 100 still further includes a modem pool 176 implemented on a digital signal processing (DSP) platform and connected via DL2 interface connections 178(1) and 178(2) to the GS/TS 142. In particular, the modem pool 176 may be selectively connected by the GS/TS 142 (at the instruction of the SCP 154) through DL2 interface connection 178(1) to any one of the POTS connection lines 144. The modem pool 176 processes (e.g., modulates and de-modulates) data communications being transmitted to or received from users 146 over the POTS connection lines 144. The DL2 interface connection 178(2) and the DL2 interface connections 160 further enable the modem pool 176 to be selectively connected (in response to SCP 154 instruction) through the GS/TS 142 to the first plurality of RPs 158(1), 158(2), ..., 158(n). This provides a route for data packet transmission between the POTS connection lines 144 and the Ethernet link 164.

The operation of the LE 100, which includes an integrated NAS functionality for supporting more efficient data communications, will now be described. In one mode of operation, the LE 100 supports efficient and direct user/subscriber data communications over a private data communications network such as the Internet 166 or possibly an intranet (not shown). In another mode of operation, the LE 100 supports efficient and direct user/subscriber data communications over a public data communications network such as the PSTN and/or ISDN 157 (concurrent with conventional voice communications). It should, of course, be understood that the LE 100 can simultaneously support such user/subscriber data communications over both the private and public networks in both modes of operation if necessary.

With respect to the first mode of operation relating to user/subscriber data communications over a private data communications network such as the Internet 166, consider first a data communication between a user 146 connected to one of the plurality of POTS connection lines 144 and the Internet 166. The data communication carried from the user 146 over the POTS connection line 144 comprises an analog data communication which is routed from the GS/TS 142 over the DL2 interface connection 178(1) to the modem pool 176 where it is de-modulated and re-output back over the DL2 interface connection 178(2). The data communication is then routed back through the GS/TS 142 and over the DL2 interface connections 160 to the first plurality of RPs 158(1), 158(2), ..., 158(n).

In the first plurality of RPs 158, the protocol of the data communication is switched (e.g., de-framed) from the protocol required for transmission over the POTS connection line 144 (e.g., PPP or Serial Line Internet Protocol (SLIP)) to the protocol required for transmission over the Ethernet link 164 (e.g., Transmission Control Protocol/Internet Protocol (TCP/IP)). The protocol converted data communication is then output to the Ethernet link 164.

The Ethernet link 164 functions to concentrate the data communication with other data communications (from other users 146, as well as users 150) received from the first plurality of RPs 158. The data communication is then sent over the Internet 166 through the Internet access point edge router 168. The first plurality of RPs 158 further perform a routing functionality in directing the data communications towards the proper Internet destinations.

Next, consider a data communication between a user 150 connected to one of the plurality of ISDN 2B+D connection lines 148 and the Internet 166. The data communication carried from the user 150 over the ISDN connection line 148 comprises a digital data communication, thus there is no need to rout the communication through the modem pool 176. Rather, the digital data communication is directly routed from the GS/TS 142 over the DL2 interface connections 160 to the first plurality of RPs 158(1), 158(2), ..., 158(n).

In the first plurality of RPs 158, the protocol of the data communication is switched (e.g., de-framed) from the protocol required for transmission over the ISDN connection line 148 (e.g., PPP or SLIP) to the protocol required for transmission over the Ethernet link 164 (e.g., TCP/IP). The protocol converted data communication is then output to the Ethernet link 164.

The Ethernet link 164 functions to concentrate the data communication with other data communications (from other users 150, as well as users 146) received from the first plurality of RPs 158. The data communication is then sent over the Internet 166 through the Internet access point edge router 168. The first plurality of RPs 158 further perform a routing functionality in directing the data communications towards the proper Internet destinations.

Reverse processes occur with respect to data communications received from the Internet 166 for GS/TS 142 transmission to the users 146 and 150. Thus, the Ethernet link 164 functions to concentrate the data communications received from the Internet 166 and the second plurality of RPs 158'. Furthermore, the first plurality of RPs 158 function to extract the data communications from the Ethernet link 164 and switch (e.g., frame) from the protocol required for transmission over the Ethernet link 164 (e.g., TCP/IP) to the protocol required for transmission over the POTS connection line 144 and ISDN connection line 148 (e.g., PPP or SLIP). The first plurality of RPs 158 and GS/TS 142 further perform a routing function in sending the data communications extracted from the Ethernet link 164 over the proper ones of the POTS connection lines 144 or ISDN connection lines 148.

Figure 2:
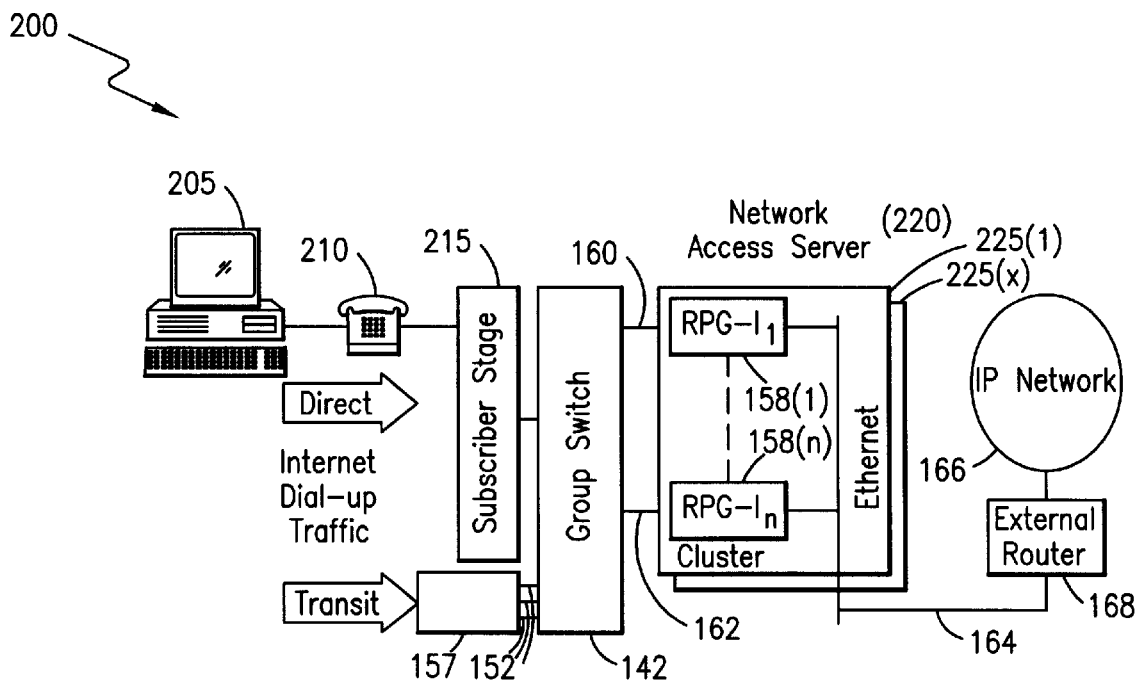
FIG. 2 illustrates a high-level diagram of a LE with an NAS which can be used to implement the present invention.

FIG. 2 illustrates a high-level diagram of a LE with an NAS which can be used to implement the present invention. A LE 200 provides a block-diagram view of the GS/TS 142, the NAS 220, and related communications equipment. A subscriber 205 (e.g., any of the users 146 or 150 of FIG. 1) uses a terminal device 210 (e.g., a computer in conjunction with a modem or NT-I) to communicate over the subscriber stage 215 (e.g., connection lines 144 or 148) directly with the GS/TS 142.

Also shown are transit communications over the PSTN/ISDN 157 over a plurality of E1/T1 trunk connections 152. It should be understood that incoming calls to the NAS 220 may also arrive via the plurality of E1/T1 trunk connections 152 from other LEs (not shown). The NAS 220 is connected to the GS/TS 142 via DL2 interface connections 160 and 162. The NAS 220 is also connected to the Internet 166 (or some other private network such as a corporate intranet) via an external router 168 (e.g., an INET-POP, an edge router, or an Internet access point edge router) over an internal network.

This internal network of the NAS 220 can be governed by a variety of protocols and run at a myriad of speeds. The internal network is preferably, however, an Ethernet network 164. The Ethernet network 164 (or a plurality of Ethernet networks 164 linked by routers and/or gateways) interconnects clusters 225(1), ..., 225(x). Each cluster 225 includes a plurality of RPG-Is (RPG-I$_1$ 158(1), ..., RPG-I$_n$ 158(n)). RPG-Is (for Regional Processor units with a Group Switch-Incoming) are specialized RPs designed for protocol conversion. The "Incoming" refers to the call side of the GS/TS 142. It should be understood that describing the present invention in conjunction with RPG-Is is exemplary only; the present invention may be practiced with general processing units.

The cluster of devices, RPG-Is 158, that are connected by the local Ethernet 164 terminates the phone calls from subscribers 205 and interprets the link layer protocols from the terminal devices 210. In an alternative embodiment, instead of the external router 168, one of the RPG devices (e.g., an RPG-O (not shown)) forwards the traffic toward the Internet via, for example, Frame Relay run on top of 2 Mb/s links back to the PSTN. RPG-Os (for Regional Processor units with a Group Switch—Outgoing) are specialized RPs designed for protocol conversion. The "Outgoing" refers to the data network side of the GS/TS 142. The hardware for RPG-Is and RPG-Os may be, but are not necessarily, identical; however, they are used for slightly different purposes.

The RPG-Is correspond to the first plurality of RPs and the RPG-Os (not shown in FIG. 2) correspond to the second plurality of RPs in the LE 100 of FIG. 1. It should be noted that a set of RPG-Is and one or more RPG-Os can be connected to one Ethernet. Multiple such Ethernets and associated RPG-I/Os may be part of a single LE. Each cluster 225(x), for example, may be connected by a separate Ethernet. It should be understood that the description below pertains to RPG-Os as well as RPG-Is when the NAS 220 is implemented with at least one RPG-O in place of the external router 168. For instance, the storage of the expected network topology in step 505 of flowchart 500 (described below with reference to FIG. 5A) should also take into consideration RPG-Os in addition to the RPG-Is when RPG-Os are present on the internal network. Other instances will be apparent to one of ordinary skill in the art after reading and understanding the principles of the present invention.

Implementing one or more RPG-Os within an LE (in lieu of connecting the Ethernet directly to routers) can be advantageous when, for example, no data network yet exists at the LE. In this situation, it is preferable to permit the LE (with RPG-Os in the NAS) to forward all (concentrated) traffic towards the ISPs/corporations/Internet over E1/T1 trunk connections operating with, e.g., Frame Relay. Elsewhere in the telecommunications network a frame relay router may then terminate the E1/T1 trunk connection and extract the packets. In any event, the internal Ethernet network 164 is a preferred implementation to achieve the desired functions of the NAS 220. It should a should be noted that a central processor (CP) (not shown in FIG. 2) (e.g., the SCP 154 of FIG. 1) supervises the behavior of the RPG-Is 158 in the NAS 220.

Figure 3:
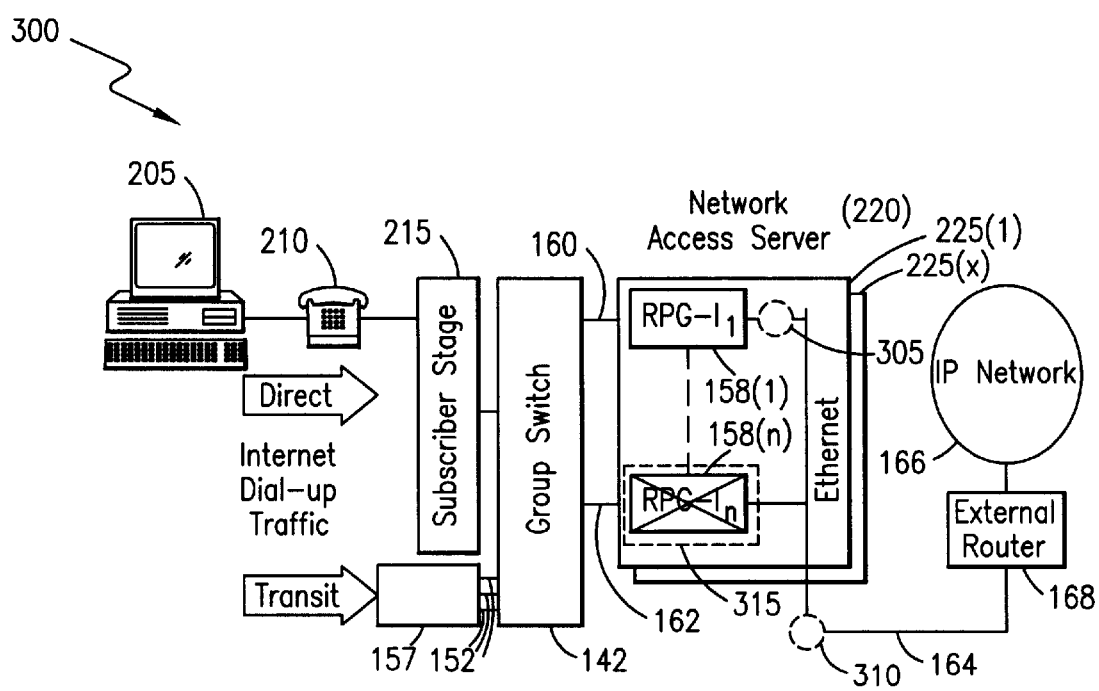
FIG. 3 illustrates a high-level diagram of a LE with an NAS that exhibits multiple potential connection problems.

FIG. 3 illustrates a high-level diagram of a LE with an NAS that exhibits multiple potential, connection problems. As a first example in the LE 300, installation personnel may connect the Ethernet 164 between incorrect RPG-Is 158 (e.g., fail to properly connect RPG-I$_1$ 158(1) as indicated at problem area 305). The result of such improper installation is that traffic destined to the external router 168 (or an RPG-O), for instance, fails to reach the external router 168.

Secondly, like any physical device, the Ethernet 164 may fail or become damaged (as indicated at problem area 310).

Thirdly, the RPG-Is themselves may malfunction (e.g., RPG-I$_n$ 158(n) has become inactive as indicated by problem area 315), either due to hardware/software problems or operator intervention.

The aforedescribed three examples demonstrate situations in which it is impossible for the dial-in subscribers 205 to send their packets to the Internet 166 (or their intended intranet) either at all or if a non-operational RPG-I 158 is selected. The present invention ameliorates these situations by monitoring connectivity through the Ethernet 164 and acting in response to acquired information.

These responsive actions according to a preferred embodiment of the present invention provide a relationship between the routing protocols and the application (e.g., the hardware and/or software of or associated with the GS/TS 142). For example, because the RPG-I$_1$ 158(1) of the NAS 220 does not have a proper connection (in the LE 300 of FIG. 3) to the external router 168 (or an RPG-0), the NAS 220 will not assign incoming calls to the RPG-I$_1$ 158(1) because the subscriber 205 will not be able to transmit any data to the Internet 166 in any case. Hence, because the LE 300 is aware of network problem areas (305, 310, and 315), the GS/TS 142 will not select an RPG-I 158 device that does not have an actual functioning connection to the Internet 166.

Figure 4:
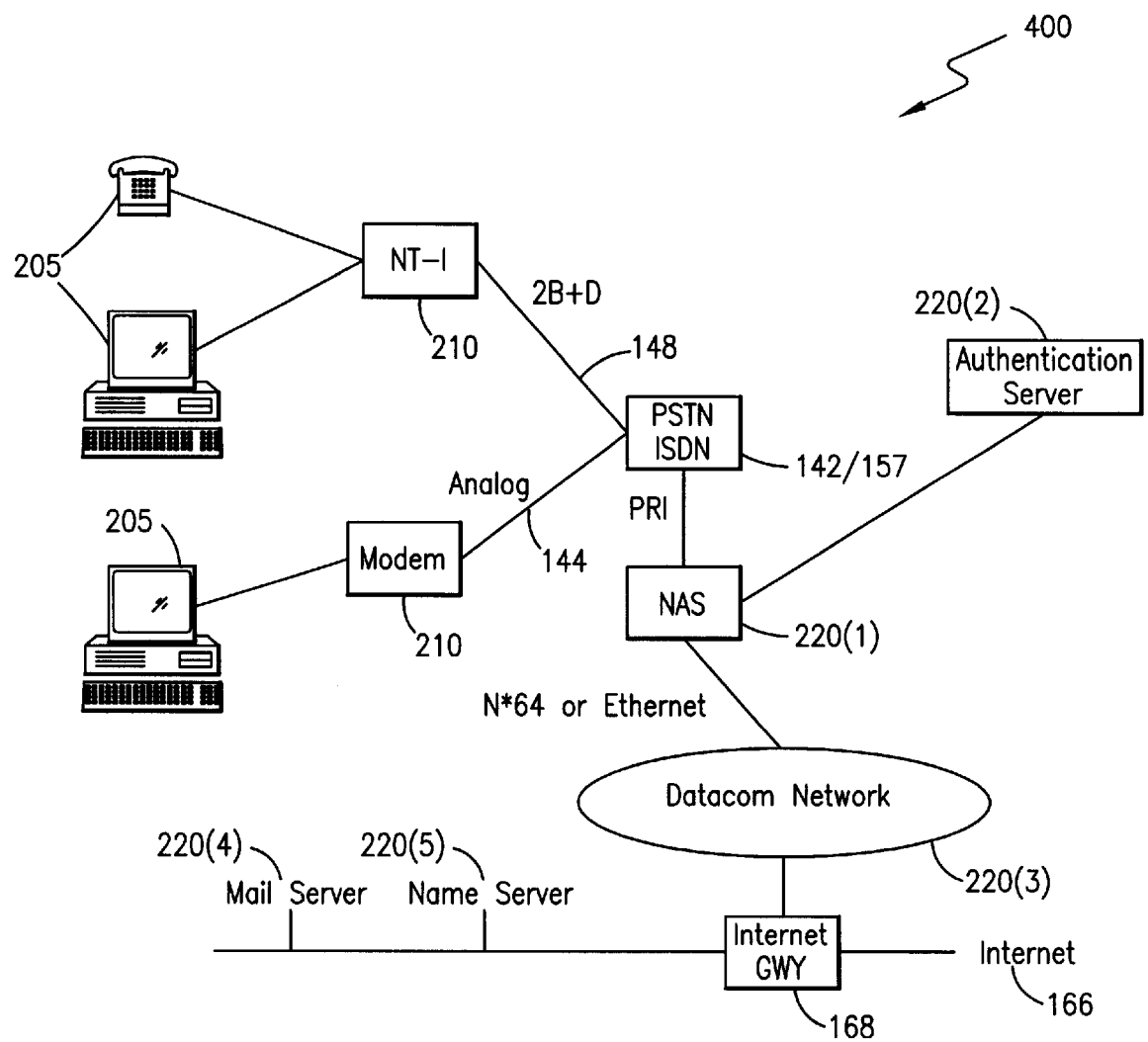
FIG. 4 illustrates additional aspects of an NAS that are subject to connection problems.

FIG. 4 illustrates additional aspects of an NAS that are subject to connection problems. Network 400 shows an alternative embodiment that includes alternative connections. For example, the link between the GS/TS / PSTN/ISDN 142/157 and the NAS 220(1) is a Primary Rate Interface (PRI). It should be noted that other interfaces may be used as well. Also, the link between the NAS 220(1) and Datacom Network 220(3) can be either N*64 or the aforedescribed Ethernet. It should be noted that other protocol interfaces may be used here as well. Network 400 also shows other elements that, when damaged or unconnected, adversely impact the ability of the NAS 220(1) to perform its network access functions.

In other words, the NAS 220 of network 400 is responsible for many functions that are important or critical to accessing a network such as the Internet 166. As explained above, the NAS 220 is responsible for terminating incoming data communication channels and routing IP packets (with possible traffic concentrating) to the Internet Gateway (GWY) 168. Furthermore, the NAS 220 preferably accomplishes (i) authentication of dialed-up connections, (ii) dynamic IP address allocation for dialed-up connections, and (iii) production of charging and billing information (i.e., accounting in general).

The NAS 220 of network 400 includes additional components that may be physically and/or logically part of the NAS core 220 (1). For example, the Authentication Server 220(2) compares a User ID and Password submitted by a subscriber 205 with the corresponding information stored in the Authentication Server 220(2) to enable/disable Internet 166 access. The Datacom Network 220(3) may be Ethernet based, or it may use another protocol. The Datacom Network 220(3) may also connect with other local or transit exchanges.

The Mail Server 220(4) and Name Server 220(5) are also important for providing full-service Internet 166 access. Connections to, and the proper functioning of, these additional components can also be monitored with the method and apparatus of the present invention. Furthermore, billing (e.g., logon time, logoff time, and subscriber identity) as well as dynamic IP address allocation are important for proper functioning of the NAS 220.

Figure 5A:
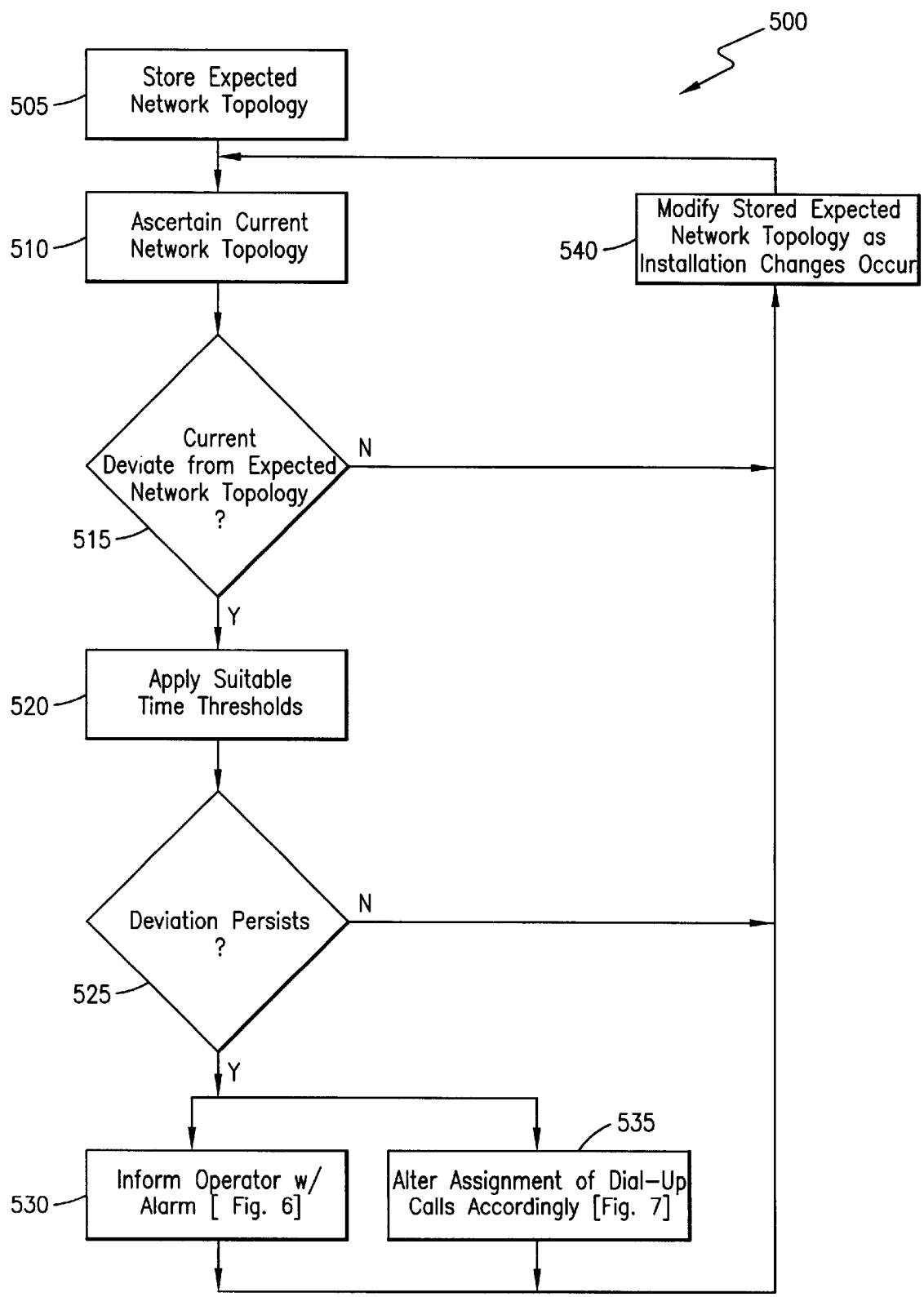
FIG. 5A illustrates in flowchart form a method for determining whether a current network topology deviates from an expected network topology according to one aspect of the present invention.

FIG. 5A illustrates in flowchart form a method for determining whether a current network topology deviates from an expected network topology according to one aspect of the present invention. The present invention advantageously connects dynamic connectivity information with application logic. Flowchart 500 begins with the storing of the expected, or intended, network topology (step 505) when the NAS 220 (of FIG. 2) is initially installed. In other words, and by way of example, the number of RPG-Is 158 in each cluster 225 is recorded in memory, preferably in a network topology data structure.

During operation of the NAS 220, the system repeatedly ascertains the current network topology (step 510). In other words, and by way of example, it is determined which RPG-Is 158 are connected to the Ethernet 164. Periodically, the current, ascertained network topology is compared to the expected, stored network topology to determine if there are any deviations (step 515). If no deviation is found, then the system may modify the expected, stored network topology if any installation changes have occurred (step 540). Subsequently, the ascertainment procedure (step 510) is repeated.

If a deviation from the expected network topology is detected (in step 515), then the system applies suitable time thresholds to ensure that an actual problem exists (step 520) and that a transient situation has not caused a false-positive in the error monitoring process. In other words, the system applies suitable time thresholds in order to prevent temporary congestion or other similar problems from affecting the true connectivity information. Exemplary time thresholds are explained below in greater detail with reference to FIG. 5B. If the deviation does not persist beyond the threshold period(s), then the system (at step 525) proceeds to optionally modify the stored expected network topology (step 540).

If the deviation does persist beyond the threshold period(s), then the system (at step 525) proceeds to make either one of two (or both) error responses. These two error responses (at steps 530 and 535) are shown in parallel to indicate that either error response may be performed first or that both error responses may be performed substantially simultaneously. The first error response is to inform the communications network operator with an alarm at a monitoring terminal (step 530). This alarm error response is explained in greater detail below with reference to FIG. 6.

The second error response is to alter the assignment of dial-up calls according to the deviations (step 535). In other words, the system application must decide what to do with existing and incoming dial-up calls to the affected devices, e.g., RPG-I 158 devices. This assignment error response is explained in greater detail below with reference to FIG. 7. After implementing the two error responses (in steps 530 and 535), the system optionally modifies the stored expected network topology if installation changes have been made (step 540). Subsequently, the ascertainment procedure (step 510) is repeated.

The ascertainment procedure can be implemented either using standard routing protocols or a protocol designed just for this purpose. The initial storing of the expected network topology may be performed (e.g., specified) by the user (e.g., a communications network administrator/operator). The application of suitable time thresholds is implemented through the use of timers, as explained further below.

Figure 5B:
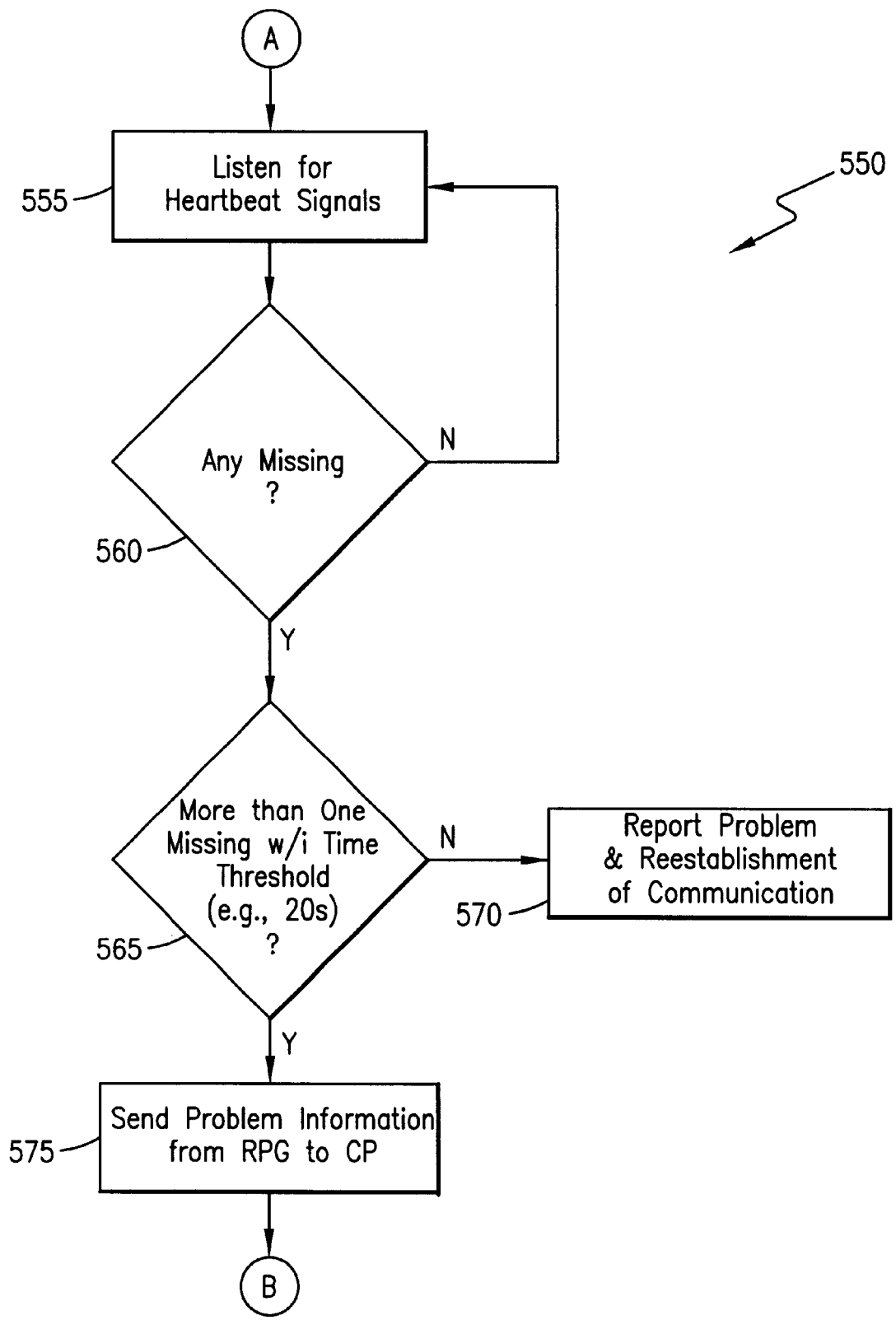
FIG. 5B illustrates in flowchart form a first half of a method for instituting time thresholds when detecting possible deviations of network topology according to a second aspect of the present invention.

FIG. 5B illustrates in flowchart form a first half of a method for instituting time thresholds when detecting possible deviations of network topology according to a second aspect of the present invention. Several data structures can be advantageously employed in computer-accessible memory to facilitate institution of the time thresholds.

Exemplary data structures for each RPG 158 (incoming, and outgoing if present) for an embodiment of the present invention are as follows:

CLPOINTER—This variable holds the cluster 225 pointer to which the RPG 158 belongs.

COMMALARM—This flag is YES (is set) when a communication alarm is currently active.

COMMTIMER—This is the timer variable, which provides the time when the timeout should occur.

PROBLEMCOUNTERS—These are the problem counters for each RPG 158 in the cluster 225.

RPGPOINTERS—This variable holds the pointers to the other RPGs 158 in the cluster 225.

RPSINALARM—These are the pointers to those RPGs 158 (preferably the five with the most problems) that appear in the current alarm list.

In the description of FIG. 5B, a cluster 225 is defined as the set of RPG-I (or RPG-O) 158 devices connected to the same Ethernet 164. The flowchart 550 may be implemented by computing elements with, for example, hardware, software, firmware, etc. Computer programs may be executing in both the CP (e.g., the SCP 154 of FIG. 1) and the RPG 158 devices. Such computer programs may be termed the CP program and the RP program, respectively, for purposes of describing their functionality.

An RPG 158 communication problem alarm is generated by a two-layer process. A lower layer observes when "heartbeat" signals (e.g., presence messages that are broadcast on the Ethernet 164 by RPGs 158) start or cease. This lower layer applies a 20 second threshold before a change in the connectivity situation is signaled to an upper layer. The lower layer observes connectivity between all cluster 225 members, including those RPGs 158 added after the first RPGs 158 were initially installed. The 20 second threshold is exemplary of the first layer of two layers of timers. The second layer of timers is discussed below.

The lower layer implementation, in this embodiment, works through both the CP and the RP programs. The RP program ensures that at least one "heartbeat" message is detected within the time threshold (e.g., 20 seconds) from every other member of the cluster 225 (from steps 515 and 520 of FIG. 5A). If not, the missed "heartbeat" message is reported to the CP program. After such a report, the re-establishment of the communication is reported only if at most one "heartbeat" message is missed within the time threshold.

The CP program monitors possible new RPG-Is 158 added to the cluster 225 (from step 540 of FIG. 5A). Upon every change to the network topology data structure, the CP program sends a new set of RPG announcement signals to the RP programs in the other members of the cluster 225 to inform them about the new or removed RPG-I 158 member. In this manner, and in response from a signal from a given RPG-I 158, the upper layer increments or decrements the problem counter associated with the given RPG-I 158. Thus, the problem counter gives the number of other RPG-Is 158 of which the given RPG-I 158 does not detect a "heartbeat" signal. The problem counters of the RPG-Is 158 that are not issuing "heartbeat" signals are unaffected.

As noted above, two layers of timers are utilized. For the first layer, the 20 second threshold is applied. For the second layer, a 10 and a 100 second pair of thresholds is applied. A timeout of 10 seconds is started for the cluster 225 after every alarm signal, and a timeout of 100 seconds is started after every cease signal. The first layer of timers (e.g., 20 seconds) is applied to reduce unnecessary communication between the CP and the RPGs due to, for example, false alarm positives during high congestion. The second layer of timers (e.g., 10/100 seconds) is applied to prevent a flurry of responses as different RPGs report the same problem at slightly different times.

Upon every restart of an RPG-I 158, a timeout of 30 seconds is initiated. After the timeout elapses, the CP program inspects all of the problem counters and decides if there is a reason to create, cease, or change the current alarms. There is a reason for an alarm to exist if some problem counter in some RPG-I 158 exceeds the number of RPG-Is 158 known to be down (e.g., blocked).

Finally, if appropriate, an alarm is generated. This alarm is preferably generated only once for each cluster 225. The alarm ceases and then starts again if there is some part of the original alarm that ceases, and then a new alarm with that same RPG-I 158 is created. In the alarm information, preferably the five RPG-Is 158 with the most problems are mentioned together with their respective problem counts. Problems are counted once for each reporting RPG-I 158; therefore, a two RPG-I 158 cluster 225 with a broken Ethernet 164 cable would generate 4 problems, 2 for each RPG-I 158. The problem counts enable the user/operator to conveniently determine the likely cause of the problem. For example, if a first RPG-I 158 has 10 problems and the other RPG-Is 158 each have one problem, then the first RPG-I 158 probably is faulty.

The alarm identification in the fault signal is based on the cluster 225 pointer. Those RPG-Is 158 that contribute to the alarm information are flagged. The identification and flagging enable the subsequent printing of the alarm information. The problem counters, next RPG-I 158 links, and alarm identification may have to be altered upon changes in the RPG-I 158 state. For example, if an RPG-I 158 is blocked, it may have to be removed from the list and the alarm possibly reissued.

Continuing now with FIG. 5B and the first half of the flowchart 550 that describes a method for instituting time thresholds, the process begins at the encircled "A". Preferably on a substantially periodic basis, each RPG-I 158 listens for "heartbeat" signals from every other RPG-I 158 in the same cluster 225 on the same Ethernet 164 (step 555). If each RPG-I 158 detects a "heartbeat" (e.g., detects a presence message on the Ethernet 164) from every other RPG-I 158 (with reference to the RPG topology data structure and the current set of RPG announcement signals) (as checked in step 560), then the periodic detecting continues (step 555) with no other action taken. If, on the other hand, an RPG-I 158 does not detect a "heartbeat" from every other RPG-I 158 (as checked in step 560), then the RPG-I 158 applies a time threshold (by proceeding to step 565).

The given RPG-I 158 that did not detect a "heartbeat" from every other RPG-I 158 applies the first layer of timers, preferably a threshold of 20 seconds (in step 565). If more than one "heartbeat" signal is not missed within the time threshold (as checked in step 565), then the given RPG-I 158 may report the reestablishment of communication as well as the problem (step 570). In this case, it is assumed that temporary congestion prevented the issuance or detection of the relevant "heartbeat" signal. If, on the other hand, more than one "heartbeat" signal is missed within the threshold period (as checked in step 565), then the given RPG-I 158 reports the problem (step 575). This problem information report is preferably sent to the CP program of the CP from the RP program of the given RPG-I 158. This problem information report corresponds to the example provided above with ten problems for one RPG-I 158 and one problem for the other RPG-Is 158. The problem information reports can be subsequently used to diagnose which device is faulty. In the example referenced immediately above, the one RPG-I 158 with the ten problems is most likely to be faulty.

Figure 5C:
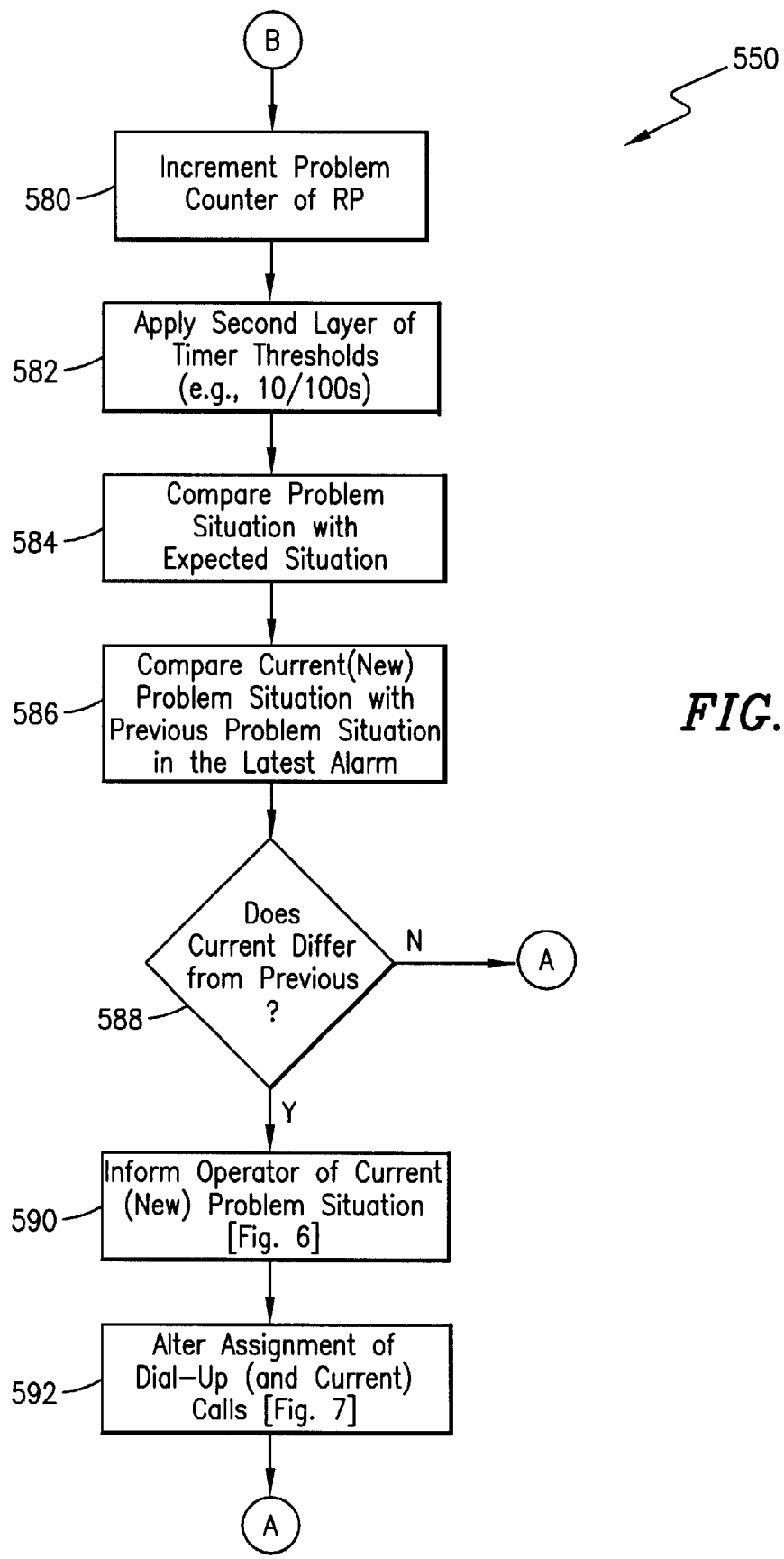
FIG. 5C illustrates in flowchart form a second half of a method for instituting time thresholds when detecting possible deviations of network topology according to a second aspect of the present invention.

FIG. 5C illustrates in flowchart form a second half of a method for instituting time thresholds when detecting possible deviations of network topology according to a second aspect of the present invention. The flowchart 550 is continued in FIG. 5C as denoted by the two encircled "Bs" both below step 575 and above step 580. The problem counter of the RPG (or, more generally, RP) is incremented (step 580).

The second layer of timer thresholds is applied to ensure that all RPGs have reported the particular problem in question (step 582). The 10/100 second timer period is applied to stabilized the situation. The 100 second time is used for ceasing alarms and the 10 second time is used for creating alarms. It should be noted that 10 and 100 seconds are exemplary only and that other time periods are within the spirit and scope of the present invention.

The problem situation is then compared to the expected situation (step 584). For example, the RPG may have been blocked (i.e., removed from service by the operator), and therefore it should be a problem and need not be reported. If the problem need not be reported, then the process can return to the beginning of the flowchart 550, which is indicated by the encircled "A" above step 555. The current (new) problem situation is next compared to the previous problem situation in the latest alarm (step 586).

It is then determined whether the current (new) problem situation differs from the previous problem situation (step 588). If not, then the process can return to the beginning of the flowchart 550, as is indicated by the encircled "As" both to the right of step 588 and above step 555. If so (e.g., now there is a problem about which no alarm has been previously generated), then the operator is informed about the current (new) problem situation (step 590) with an alarm report. At least the five RPGs with the most problems (including their problem counters) are preferably mentioned in the alarm report. The sending of the alarm report to the operator is further explained below with reference to FIG. 6.

Additionally, the assignment of dial-up (and current) calls is altered appropriately (step 592) in response to an affirmative determination in step 588. The process of altering the assignment of dial-up and current calls is explained in greater detail below with reference to FIG. 7. It should be noted that step 592 may precede step 590 and that they may alternatively be performed partially, substantially, or completely in parallel. Furthermore, only one or the other of steps 590 and 592 may be performed. In any event, the process can return to the beginning of the flowchart 550, as indicated by the encircled "As" both below step 592 and above step 555.

Furthermore, it'should be noted that the modification procedure (e.g., of step 540 of FIG. 5A) can also be used to modify the network topology data structure when an RPG-I 158 is determined to be faulty. If a given RPG-I 158 is faulty and therefore unable to issue a "heartbeat" signal, then the other RPG-Is 158 should not expect to receive one (e.g., in steps 555 and 560 of FIG. 5B). Alternatively, the CP can memorialize a real-world change from the recorded network topology data structure and merely ignore "problems" regarding RPGs that are known to be blocked or faulty. This scenario was alluded to above in connection with the description of step 584 (of FIG. 5C).

Figure 6:
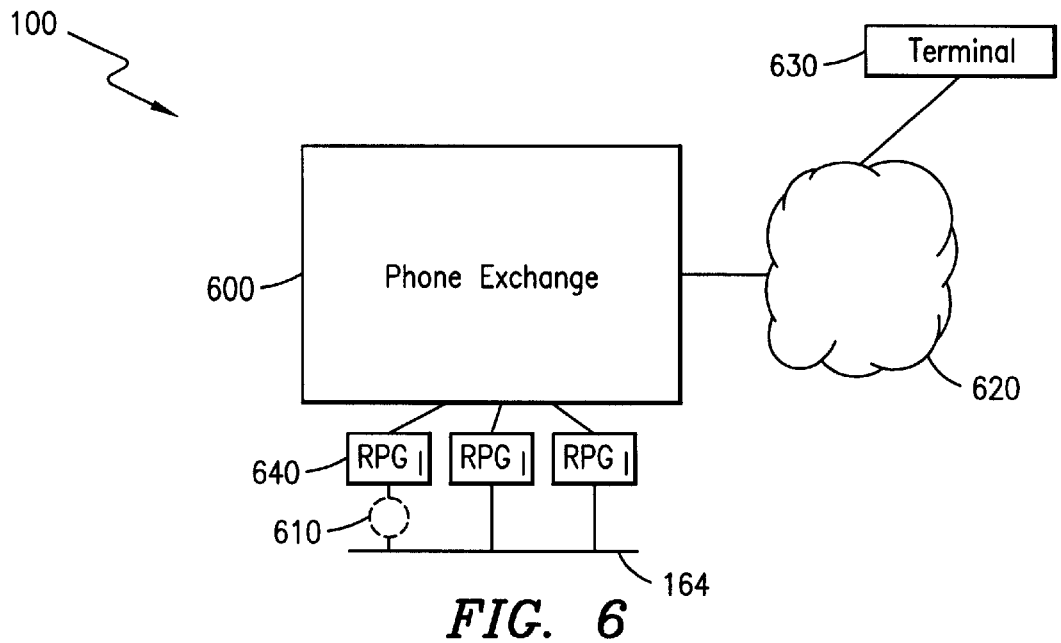
FIG. 6 illustrates the transmission of an alarm from a LE to a network operator according to a third aspect of the present invention.

FIG. 6 illustrates the transmission of an alarm from a LE to a network operator according to a third aspect of the present invention. The LE 100 shows the phone exchange 600 (e.g., a GS/TS 142 with related apparatus such as the modem pool 176 from FIGS. 1–2) making a report to an operator's terminal 630. A problem has been detected at problem area 610, and problem area 610 renders RPG 640 inoperable at least with respect to connecting through to the Ethernet 164.

An alarm is transmitted through connection 620, which may be any local link or network through which the operator's terminal 630 is connected to the LE 100. Connection 620 can correspond to, for example, the Ethernet 164, the DL2 interface connections 160 and 162, E1/T1 trunk connections 152 (all of FIG. 1), the Datacom Network 220(3) (of FIG. 2), or any combination thereof. The operator terminal 630 can also be located at the LE 100. When the deviation is detected and the alarm is issued, the LE 100, in accordance with the present invention, informs an operator by displaying and/or printing an alarm on the operator's terminal 630. This alarm preferably includes an indication of the identity of the RPG-I 158 (e.g., RPG 640) and of the nature of the problem area (e.g., malfunctioning RPG 640 or damaged Ethernet 164).

Figure 7:
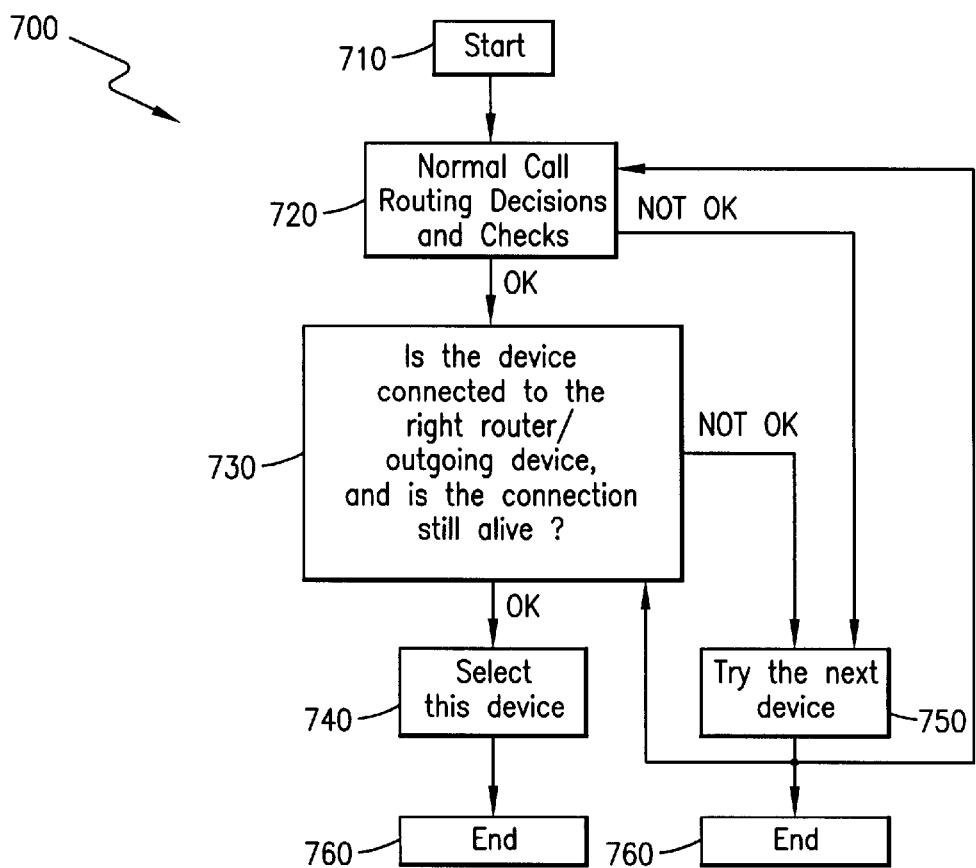
FIG. 7 illustrates in flowchart form a method of ensuring that a device to be selected can provide communication throughput according to a fourth aspect of the present invention.

FIG. 7 illustrates in flowchart form a method of ensuring that a device to be selected can provide communication throughput according to a fourth aspect of the present invention. Flowchart 700 consists of the call routing process making an additional check with respect to incoming calls. Optionally, existing calls can also be run through this check in order to determine if the call should be moved to another device, be disconnected, or have special billing be adopted. Providing the GS/TS 142 with an alarm report and/or RPG-I 158 fault information enables the GS/TS 142 to avoid routing subscriber 205 calls to inoperable RPG-Is 158.

The call-analyzing process begins (at step 710). Normal call routing decisions and checks are performed (step 720). If everything is "NOT OK", then the next device (e.g., the next RPG-I 158) is tried (step 750). The attempt to establish a connection for the previous device ends (step 760), and the next device is tried by looping back up to perform normal call routing decisions and checks on the next device (step 720 again). If everything does check out "OK", then the process may continue.

The process of flowchart 700 continues by determining whether the selected device (e.g., an RPG-I 158) is connected to the right router/outgoing device (e.g., the external router 168) and whether the connection is still alive (step 730). If these issues are "NOT OK", then the next device (e.g., the next RPG-I 158) is tried (step 750). The attempt to establish a connection for the previous device ends (step 760), and the next device is tried by looping back up to perform another set of determinations regarding whether the device is connected to the right router/outgoing device and whether the connection is still alive (step 730 again). If these issues are now "OK", then the current device is selected (step 740). The process can then end (step 760). Because the GS/TS 142 can perform the process of flowchart 700, calls from subscribers 205 will not be routed to devices that cannot provide connection to the Internet 166.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for improving call-routing efficiency for a network access server that is associated with a telecommunications switch, comprising the steps of:
    storing an expected network topology of a first network of said network access server;
    detecting whether a current network topology deviates from said expected network topology;
    detecting whether said current network topology continues to deviate from said expected topology;
    identifying a portion of said first network that deviates from said expected network topology;
    reporting a detected continue deviation of said current network topology from said expected network topology to a network operator; and
    routing calls away from said portion of said first network.

2. The method of claim 1, further comprising the steps of:
    waiting for a predetermined threshold period when the step of detecting detects that said current network topology deviates from said expected network topology;
    detecting whether said current network topology continues to deviate from said expected network topology after said predetermined threshold period expires; and
    wherein the step of routing calls away from said portion of said first network further includes the step of routing said calls away from said portion of said first network only if said current network topology continues to deviate from said expected network topology after said predetermined threshold period expires.

3. The method of claim 1, further comprising the step of:
    updating said expected network topology in response to installation changes or detected deviations.

4. The method of claim 1, wherein the step of routing calls away from said portion of said first network further comprises the step of routing incoming calls away from said portion of said first network.

5. The method of claim 1, wherein the step of routing calls away from said portion of said first network further comprises the step of rerouting current calls away from said portion of said first network.

6. A method for enabling a telecommunications switch and an associated network access server to route calls to processing devices that have a functioning connection to a desired network, comprising the steps of:
    recording an expected network topology of a first network that is associated with said network access server;
    monitoring said first network;
    detecting deviations from said expected network topology in said first network by determining whether a first processing device provides said functioning connection to said desired network by determining whether each processing device of a plurality of processing devices that are on said first network can provide said functioning connection to said desired network; and
    if so, assigning a call to said first processing device.

7. The method of claim 6, further comprising the step of:
    if not, trying a second processing device to determine whether said second processing device provides said functioning connection to said desired network.

8. The method of claim 6, further comprising the step of:
    if not, issuing an operator alarm, said operator alarm indicating a problem area.

9. The method of claim 6, wherein the step of recording further comprises the step of:

recording an expected network topology of a first network that is associated with said network access server, wherein said first network is of an Ethernet type.

10. The method of claim 6, wherein the step of recording further comprises the step of:

recording a number of processing devices that are expected to be connected to said first network.

11. The method of claim 6, wherein the step of recording further comprises the step of:

recording an identity of each processing device that is expected to be connected to said first network.

12. The method of claim 6, wherein the step of recording further comprises the step of:

recording an expected initial network topology of said first network upon initial installation.

13. The method of claim 6, wherein the step of recording further comprises the step of:

updating said expected network topology when either a new processing device is installed or a current processing device is detected as not having said functioning connection to said desired network.

14. The method of claim 6, wherein the step of monitoring further comprises the step of:

monitoring said first network for presence messages from other processing devices on said first network.

15. The method of claim 6, wherein the step of detecting further comprises the step of:

comparing a plurality of detected presence messages to said expected network topology.

16. The method of claim 15, wherein the step of detecting further comprises the step of determining, based on the step of comparing, whether at least one presence message is missing; and further comprising the step of:

issuing a problem information report if said at least one presence message is determined to be missing.

17. The method of claim 6, further comprising the step of:

determining whether a processing device that does not provide said functioning connection to said desired network is malfunctioning, installed incorrectly, or connected to said first network, which said first network is damaged.

18. The method of claim 6, wherein the step of detecting further comprises the step of:

diagnosing which processing device, among a plurality of processing devices that are connected to said first network, or which portion of said first network is preventing said functioning connection to said desired network.

19. The method of claim 6, further comprising the step of:

ascertaining whether a detected deviation persists for longer than a predetermined threshold period; and wherein said step of determining determines that said first processing device does not have said functioning connection if said detected deviation persists for longer than said predetermined threshold period.

20. The method of claim 6, wherein the step of assigning further comprises the step of:

assigning said call, wherein said call is a new dial-up call.

21. The method of claim 6, wherein the step of assigning further comprises the step of:

assigning said call, wherein said call is a current call that is being transferred from a problem area.

22. The method of claim 6, wherein said desired network is the Internet.

23. A method for improving call-routing efficiency for a network access server that is associated with a telecommunications switch, comprising the steps of:

storing an expected network topology of a first network of said network access server;

detecting whether a current network topology deviates from said expected network topology;

identifying a portion of said first network that deviates from said expected network topology;

waiting for a predetermined threshold period when the step of detecting detects that said current network topology deviates from said expected network topology;

detecting whether said current network topology continues to deviate from said expected network topology, after said predetermined threshold period expires; and routing said calls away from said portion of said first network only if said current network topology continues to deviate from said expected network topology after said predetermined threshold period expires.

* * * * *